May 29, 1962

G. S. KNOX 3,036,590

VALVE SUB

Filed July 7, 1958

INVENTOR.
GRANVILLE S. KNOX
BY White & Haeflin
ATTORNEYS.

May 29, 1962
G. S. KNOX
3,036,590
VALVE SUB
Filed July 7, 1958
4 Sheets-Sheet 2
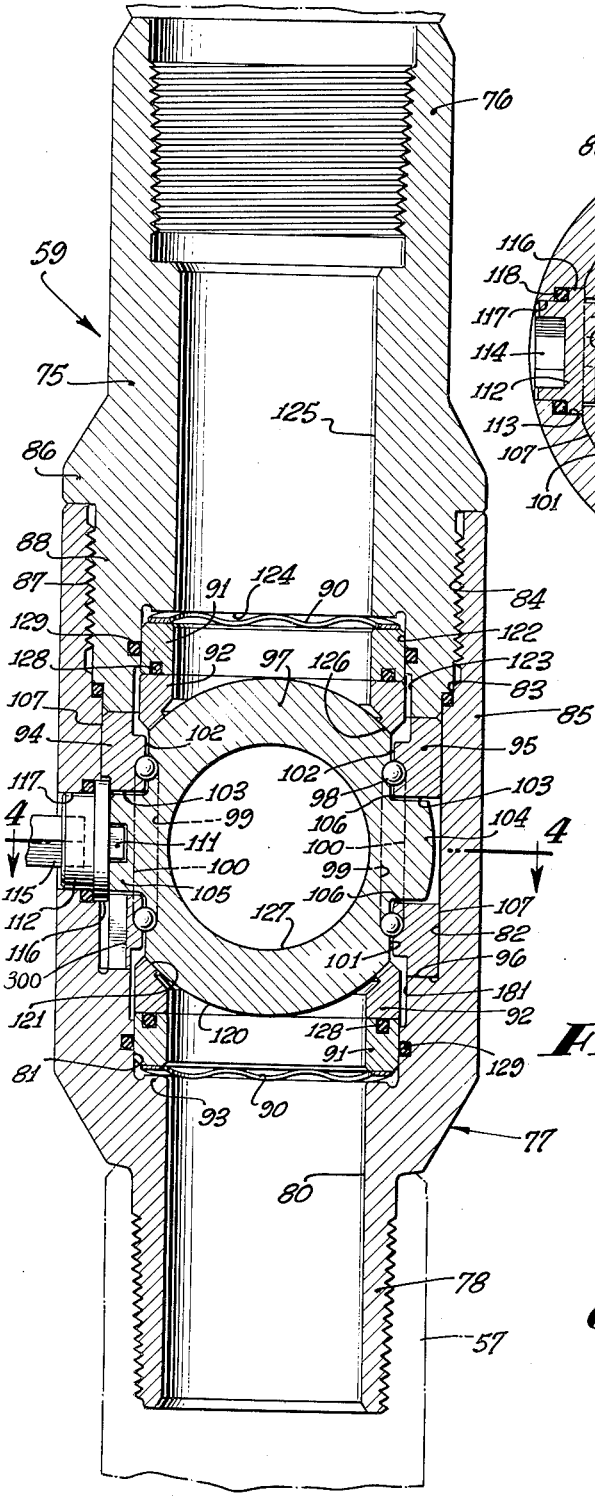
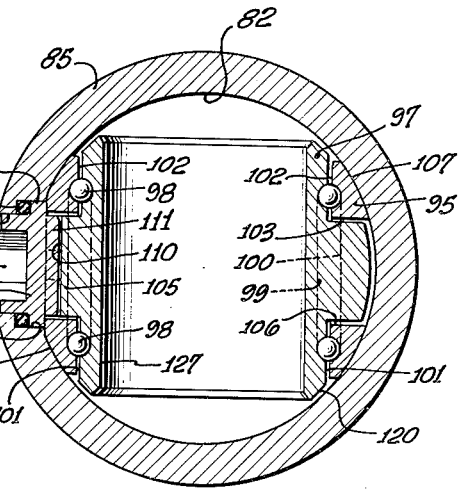
FIG. 4.
FIG. 3.
GRANVILLE S. KNOX
INVENTOR.
BY *White & Haefliger*
ATTORNEYS.

May 29, 1962

G. S. KNOX 3,036,590

VALVE SUB

Filed July 7, 1958

GRANVILLE S. KNOX
INVENTOR.

BY *White & Haefliger*

ATTORNEYS.

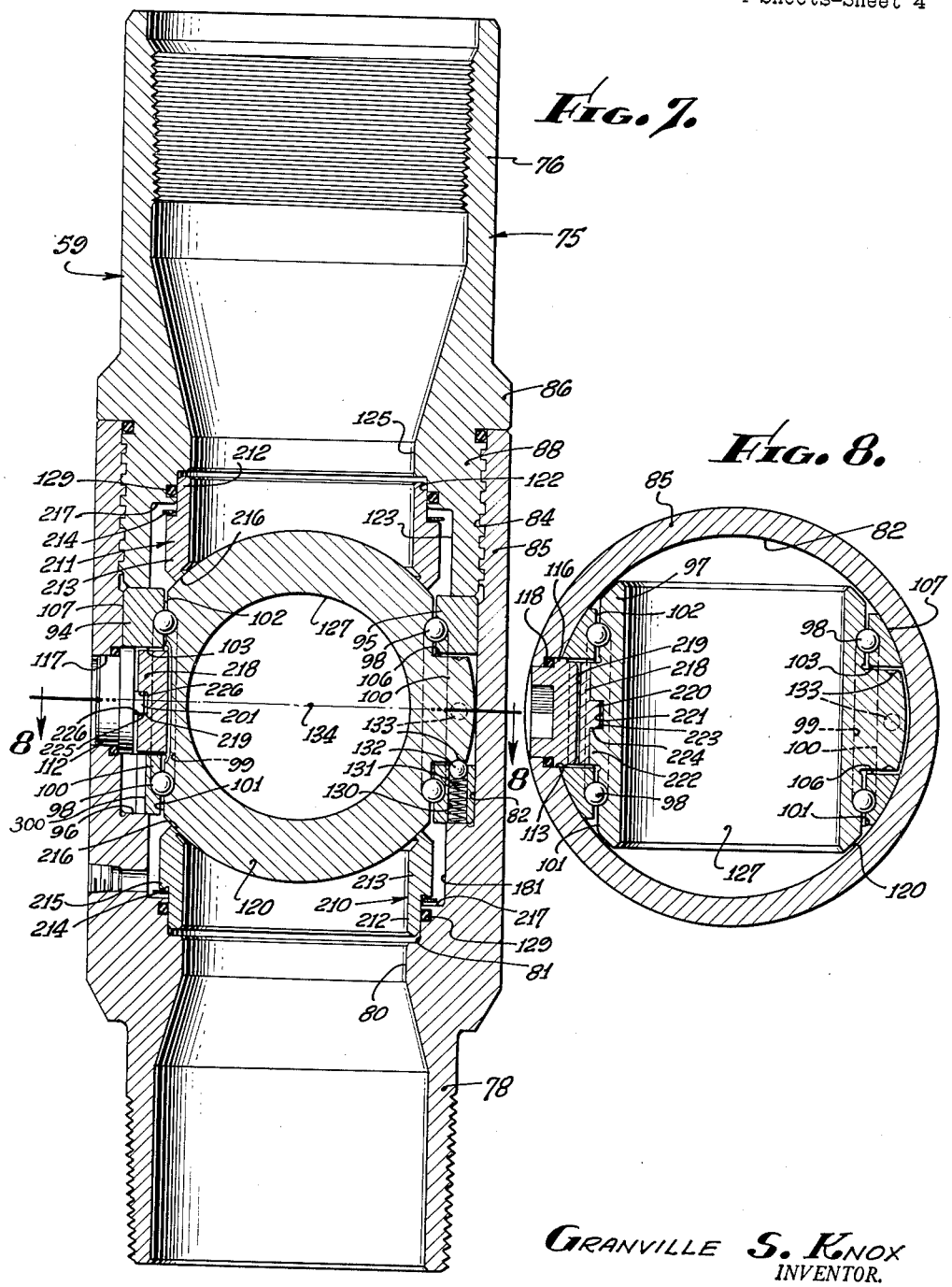

United States Patent Office 3,036,590
Patented May 29, 1962

3,036,590
VALVE SUB
Granville S. Knox, Glendale, Calif., assignor to Hydril Company, Los Angeles, Calif., a corporation of Ohio
Filed July 7, 1958, Ser. No. 746,699
6 Claims. (Cl. 137—315)

This invention relates generally to valves used in oil well drilling operations, and more particularly concerns improvements in so-called kelly cocks or safety valves connectible into drilling or tubing strings and operable when open to pass fluid circulation downward through the string and when closed to shut off back-flow therethrough as when a blow-out threatens to occur.

Safety valves adapted for this particular use have to be readily closable, even against relatively high differential pressures, and lacking this capacity there is ever present the danger of uncontrolled blow-out of a well through the tubing string, with all its undesirable consequences. This danger has been present where drilling operations were carried out using safety valves of conventional construction commonly incorporating valve stoppers having high frictional contact with the valve body and valve seats, high differential pressures acting across such stoppers tending to jam them so tightly against said valve seats or body portions that rotating the stoppers becomes exceedingly difficult and oftentimes practically impossible.

Other requirements imposed on safety valves suitable for intended use in drilling strings include the necessity that the valve body external or outside dimensions be small enough to permit its lengthwise passage through well casing and blow-out prevention equipment, plus the feature that the valve stopper be sufficiently openable so as not to restrict the downward flow of drilling mud or otherwise obstruct the passage of well tools therethrough. These contradictory considerations concerning the valve structural requirements plus the necessity that the valve stopper be mounted so as to be freely turnable against the full well pressure imposed on the stopper, present problems in valve design having no easy or obvious solution in view of any prior art of which I am aware.

Having in mind the above, it is a major object of the present invention to provide an easily turnable safety valve rapidly connectible into a drill string and having a relatively large streamlined flow passage in a valve body of only relatively slightly enlarged dimensions as respects the bore and outer diameter of the tubing string into which the valve is connectible. This object has been attainable by mounting the stopper on novel anti-friction ball bearing assemblies located entirely within a comparatively small flow passage enlargement inside the valve body, the bearing assemblies being inserted longitudinally into the tubular box member forming the passage enlargement so as to give rotary support to the stopper at its laterally opposite sides, the bearing means also fitting over rotary means blocked against withdrawal from a side opening and operable to rotate the stopper between open and closed positions, thereby to provide a highly unusual and compact functioning assembly. The bearing assemblies are preferably held within the small passage enlargement in the box member by a second tubular member, for example a pin member connected into the box member, and the bearings are normally isolated from the drill string bore by seating means, preferably a pair of rings extending in lateral planes and operable to seal off between the stopper and tubular members when the valve stopper is in either the open or closed position. Preferably two pairs of rings positioned at opposite sides of the stopper are used to effect the desired seal, one ring of each pair engaging the stopper and being movable laterally relative to a second ring with which the first ring is in annular engagement, the second ring being constrained by the tubular body to move longitudinally only. In the preferred form, the rings engaging the stopper are free-floating and self-alinging to maintain a perfect seal.

Rotation is transmissible to the stopper by means of an operating stem which projects laterally through a side opening in the tubular box member containing the stopper, and partially through a lateral opening in one of two bearing assembly plates received longitudinally into the box member. This same plate is also slotted longitudinally to receive a portion of the operating stem as the plate and stopper are assembled with bearing balls held between laterally opposed faces thereof, after the stem has been inserted into the side opening in the box member.

The ball bearing arrangement is novel in a valve of this kind in that the ball races are formed in laterally opposing planar surfaces which extend longitudinally and parallel to the axis of the flow passage, this construction facilitating making the races of relatively large diameter and also distributing the load upon a greater percentage of the total number of balls in the races, because the load is carried by balls on both sides of each race. Were the bearing of the conventional radial type, the loading would not be well distributed, but would be applied only to the balls on one side of each race, making the stopper much more difficult to turn during the application of extremely high well fluid pressures on the valve.

Other objects of the invention include the combination in a drill string of the novel plug type safety valve and a second and preferably a flapper type float valve inserted in the string above the plug type safety valve.

Float or check valves are seldom used in oil well drilling strings because they obstruct the passage therethrough of core barrels, surveying instruments and other well tools. Also, when used during continuous drilling operations, they are often found to be ineffectual for completely shutting off an upflow of pressure through the drill string because the valve parts soon become eroded and worn by abrasive materials in the drilling mud.

Typically, the safety valve sub is connected to the upper end of the drill string after a blow-out preventer has been closed to shut in an abnormal upflow of gas-cut mud through the annular space between the drill string and the casing, as such gas-cut mud flow gives warning of a possible blow-out of pressure through the drill pipe. The safety valve, when in the open position, is capable of being connected into the drill string even during the early stages of a blow-out therethrough, and therefore is connected into the string prior to the float valve which cannot be added once upflow has commenced.

After the safety valve has been connected into the drilling string it can be rotated to closed position to arrest the upflow of pressure, thereby permitting installation of the float valve. The safety valve can then be re-opened as the float valve will then retain the pressure while preparations are made to circulate heavier mud down through the float valve to the bottom of the well in order to overbalance and shut off any inflow of pressure from the producing formations. After the well has been killed by circulating the heavier mud, the drill string can be withdrawn from the well and the float and safety valves removed therefrom to permit the resumption of normal drilling activities.

The plug and float valve combination in the string have minimum body external dimensions in relation to the tubing outer diameter so as to be capable of being freely run down through a well head assembly into well casing supporting the head assembly, which includes a blow-out preventer for packing off about the tubing and valve bodies, and also a tubing stripper unit, as will be described.

These and other objects and advantages of the invention, as well as the details of an illustrative embodiment, will be more fully understood from the following detailed description of the drawings, in which:

FIG. 3 is a further enlarged vertical section through the novel plug type safety valve rotated into closed position;

FIG. 4 is a section taken on line 4—4 of FIG. 3;

FIG. 7 is a vertical section through a modified valve assembly; and

FIG. 8 is a section taken on line 8—8 of FIG. 7.

Figure 1:
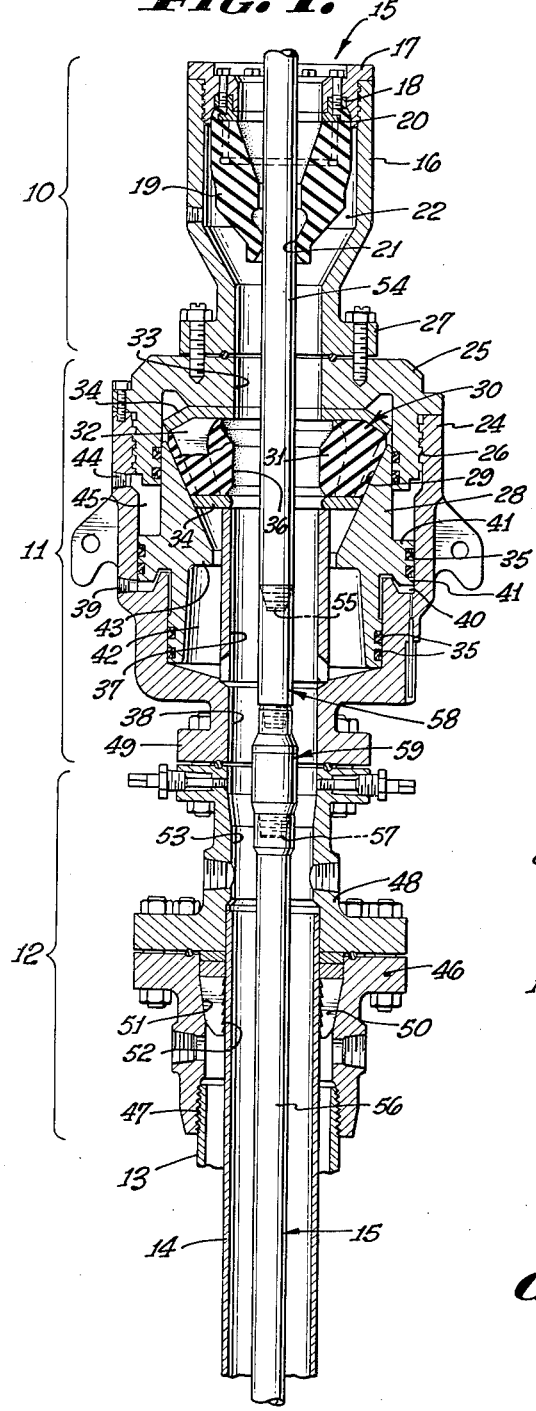
FIG. 1 is a vertical elevation taken in section through a well head assembly mounted on well casing and showing the manner in which a drill string including the plug type safety valve of the present invention is received in the assembly.

Referring first to FIG. 1 of the drawings, the well head assembly shown therein includes a tubing stripper unit 10, a blowout preventer unit 11 below the stripper unit, and a casing head assembly 12 below the preventer unit, the latter head assembly being threaded on and supported by the outer casing 13, which therefore supports the entire well head assembly including units 10 through 12. As shown in the drawing, an inner casing 14 projects upwardly through and terminates above the outer casing, and a string of tubing, for example a drill string is indicated generally at 15 as projecting upwardly through the inner casing and through the well head assembly.

Referring to the tubing stripper unit 10, it includes an annular body 16, a head 17 connected into the upper end of the body 16, a retainer 18 connected against the underside of the head within the body 16, and finally a stripper packer or rubber 19 carried by and depending from a retainer flange 20. The annular packer converges in a downward direction and centrally toward the tubing string 15, and has an annular flexible sealing lip 21 in annular engagement with the tubing string and forming a pressure tight seal thereabout. Well pressure, passing upwardly between the inner casing 14 and tubing will, upon arrival in the chamber 22 formed between the rubber 19 and body 16, be applied against the outside of the rubber packer, collapsing same about the tubing and blocking upward pressural extrusion of the sealing lip. Construction of the stripper packer unit is described in my co-pending application Kelly Packer and Blowout Preventer, filed May 23, 1955, Serial No. 510,456, now Patent No. 2,862,735 granted December 2, 1958.

The blowout preventer unit 11 includes a housing 24, a head 25 threaded into the housing at 26 and bolted to a flange 27 of the stripper packer unit 10 thereabove. Carried within the housing 24 is an annular contractor piston 28 having a downwardly tapering face 29 supporting an annular packing unit generally indicated at 30. The latter comprises an annulus 31 of cohesive plastic material, preferably molded rubber, in which a circularly spaced series of metal ribs 32 have been molded for anchoring the rubber material, the ribs being operable to prevent extrusion or flow of rubber upwardly through the bore 33 of the head 25 when the underside of the packing of the unit is subjected to high well pressures. The upper and lower faces of the annulus are confined between a series of circularly spaced flanges 34 integral with the ribs 32, the flanges, ribs and annulus 31 being movable inwardly in response to upward displacement of the contractor piston 28, whenever it is desired to seal off completely about tubing string 15. Since the contractor piston is in turn sealed off at locations 35 against the inside of the housing 24, the piston and packing unit together comprise a means for sealing off between the housing and the tubing. In its open position the bore 36 of the annulus 31 is flush with the bores 33, 37 and 38 of the remainder of the blowout preventer, so that the tubing string 15 is freely movable upwardly and downwardly therethrough. When sufficient fluid pressure is delivered through inlet 39 to setting chamber 40 below the contractor piston flange 41, the piston lifts and squeezes the packing unit inwardly to seal off about tubing string 15. Well pressure entering the chamber 42 below the contractor piston flange 43 aids in lifting and holding the contractor piston in lifted condition. Pressure from an external source is deliverable through inlet 44 to chamber 45 above the contractor piston flange 41 for urging the contractor piston downwardly against the well pressure in chamber 43, relieving the squeezing loading exerted on the packer unit 30 and thereby allowing the latter to radially expand away from the tubing string.

The casing head unit 12 includes a slip bowl housing 46 in threaded engagement with the outer casing upper end at 47, a head 48 bolted to the housing 46 and also to a flange 49 integral with the preventer housing, and a circularly spaced series of casing slips 50 received in the slip bowl 51. The slips, of course support the inner casing at the serrations 52. As shown, the tubing string 15 is freely movable upwardly and downwardly through the bore 53 of the head 48.

Figure 2:
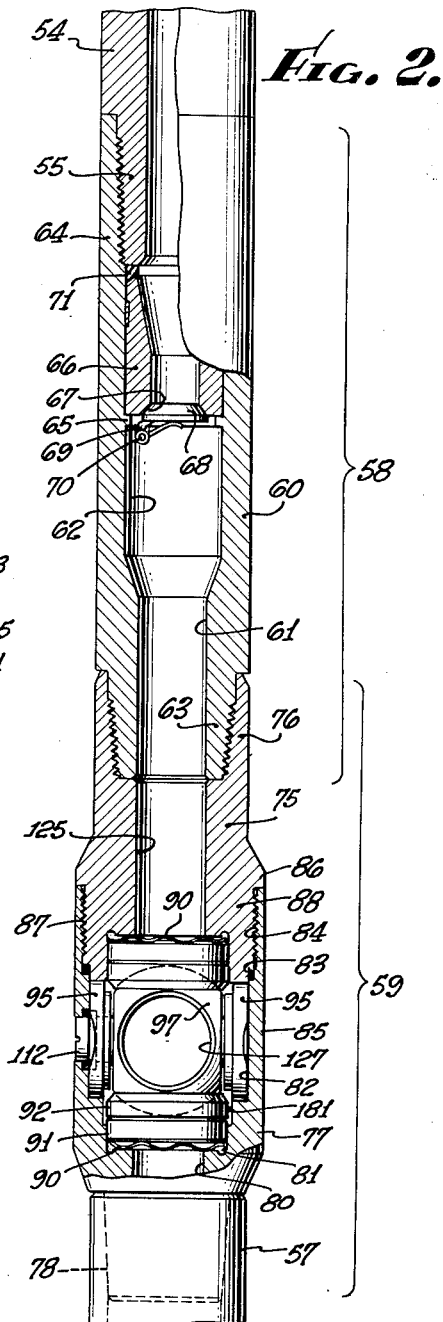
FIG. 2 is an enlarged elevation, partly broken away, showing the manner in which the plug type safety valve of the present invention is inserted in the drill string in combination with a flapper type float valve.

Referring now to both FIGS. 1 and 2, and particularly to the elements of the tubing string 15, they include an upper tubing stand 54 having a downwardly projecting externally threaded pin 55, lower tubing stand 56 including an upwardly projecting internally threaded box 57, and a pair of valve subs 58 and 59 connected in series between the pin and box members 55 and 57. The upper valve sub comprises a tubular body 60 having a bore 61 and a bore enlargement 62, the former extending downwardly through the sub pin member 63 and the latter extending upwardly through the sub box member 64 which receives the pin 55 of the upper tubing stand. An annular flange 65 projecting inwardly from the bore enlargement 62 seats an annulus 66 received in the bore enlargement, the annulus having a spherical seat 67 for complimentary flapper type float valve stopper 68. The latter is carried by the annulus 66 and hinged at 69 for downward opening and upward flow through the bore enlargement 62, a coil spring 70 bearing against the valve stopper 68 being operable to urge the stopper upwardly into the closed position in which it is illustrated. Annulus 66 is held against the shoulder 65 by an annular compressible seal 71 fitted against the upper end of the annulus 66 and in turn retained in position by the pin member 55.

The lower valve sub 59 better shown in FIG. 3, includes an upper tubular body 75 having an internally threaded box member 76 for receiving the pin member 63, and a lower tubular body 77 having an externally threaded pin member 78 received in the box 57 of the lower tubing stand, as indicated by the broken lines of FIG. 3. Body 77 is somewhat larger than the outer diameter of the box member 57, although not so large as to be incapable of vertical passage through the well head assembly shown in FIG. 1 and particularly through the stripper rubber 19.

Tubular body 77 has an inlet or outlet bore 80 of the same size as the main bore of the tubing string, and also has counterbores 81, 181, 82 and 83, the latter being tapped to provide internal threads 84 at the upper end of the box member 85 formed by the counterbores in body 77. The upper tubular body 75 is upset to form a flange 86, and is turned and threaded at 87 to form a pin member 88 receivable downwardly into the box member 85 and in threaded engagement therewith as shown, engagement of the flange 86 with the upper end of the box member 85 limiting reception of the pin member 88 therein.

Prior to insertion of the pin member 88 into the box member 85, an annularly bowed flat spring 90 and a pair of annular rings 91 and 92 are inserted into the box member as shown, ring 91 having a slip fit with the counterbore 81, and ring 92 and counterbore 181 having substantial lateral clearance therebetween, the corrugated flat spring 90 seating on shoulder 93 and urging ring 91 into annular engagement with the ring 92.

Next, a pair of opposed bearing plates 94 and 95 are inserted longitudinally into the box member 85 so as to seat at annular shoulder 96 formed by cutting of the counterbores 181 and 82. At the time of their insertion into the box member, the bearing plates 94 and 95 retain between one another a plug type stopper 97 and bearing balls 98 extending within longitudinally planar and parallel annular grooves or ball races 99 and 100 respectively cut in laterally opposite sides 101 of the stopper and lateral sides 102 of the bearing plates. The latter contain lateral openings or bores 103 therethrough loosely receiving the oppositely extending projections 104 and 105 of the stopper which do not transmit loading from the stopper to the plates. Instead all loading is transmitted through the bearing balls to the bearing plates, and by virtue of the novel design the longitudinally symmetric balls as illustrated in FIG. 3 transmit equal loading, achieving very desirable distribution of the loading among the balls. Annular portions of the bearing plates 95 within which the grooves 100 are cut are received in annular notches 106 cut in opposite sides of the generally spherical stopper 97, and it will be understood that the opposite sides 101 of the stopper adjacent the notches 106 and the inner faces 102 of the bearing plates extend in parallel longitudinal relation. On the other hand, the outer faces 107 of the bearing plates are generally cylindrical and have the same curvature as counterbore 82 so as to nicely fit therein when the stopper and bearing plates are inserted longitudinally into the box member 85. Accordingly, the bearing balls intermesh with the stopper and the balls and plates comprise means supporting the stopper.

Figure 5:
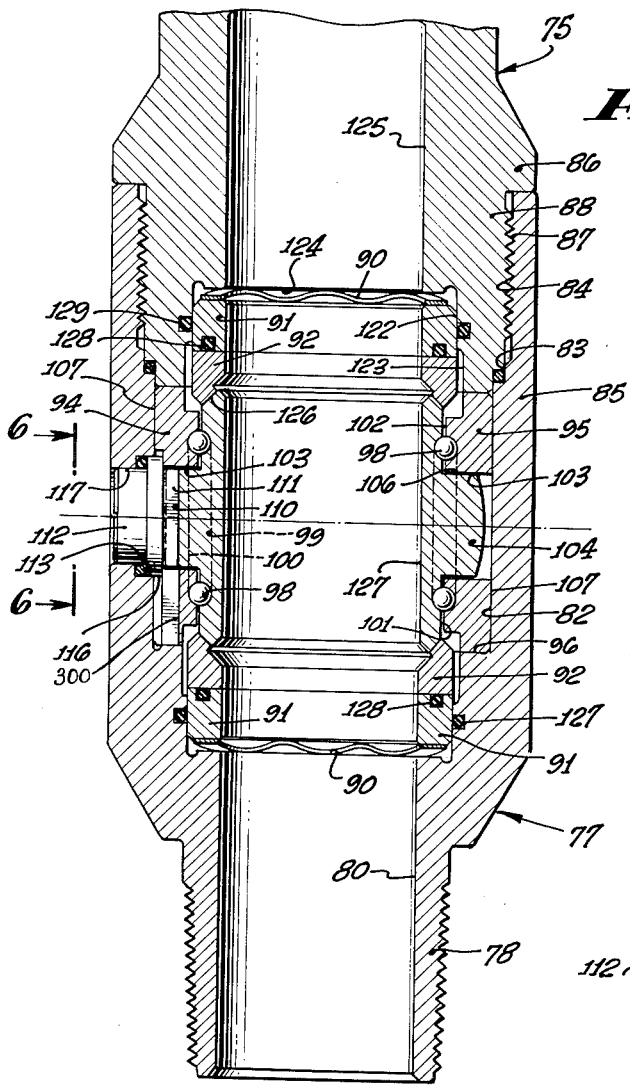
FIG. 5 is a view similar to FIG. 3 showing the valve rotated into open position.
Figure 6:
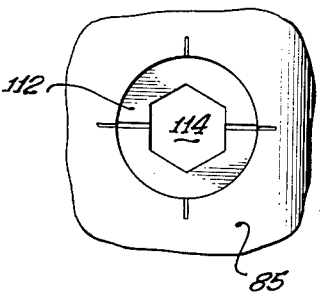
FIG. 6 is a side elevation taken on line 6—6 of FIG. 5.

Such insertion is carried out with the stopper rotated into open position as viewed in FIG. 5 so that a then longitudinally extending slot or keyway 110 formed in the projection 105 will receive or slip over a key 111 projecting into the counterbore 82 as viewed in FIGS. 4 and 5. Key 111 is integral with operating stem 112 received in an opening 113 extending through the side of the box member 85 opposite the stopper projection 105. Operating stem 112 contains a hex recess 114 opening laterally outwardly at the exterior of the box member for receiving the hexed shank of a turning tool shown at 115 in FIG. 3, the tool then being rotatable to rotate stem 112 and thereby the key 111 and the stopper itself to the closed position of FIG. 3. Stem 112 is retained in the counterbore opening 113 by a flange 116 received in the opening 113, the main bore 117 thereof receiving the recessed outer end of the stem 112. Structure 111 and 112 comprise one form of rotary means to rotate the stopper between open and closed positions, said rotary means being blocked against outward withdrawal from opening 117 by structure adjacent the opening and in the path of outward withdrawal of flange 116. An annular seal 118 in the counterbore seals off between the flange 116 and the box member 85 as seen in FIG. 3, the plate 94 is slotted at 300 to pass the flange 116 and key 111 when the assembled stopper and plate 94 are inserted into the bore enlargement 82.

Turning to FIGS. 3 and 5, it will be seen that the spherical surface 120 of the stopper is in pressure sealing engagement with the annular sealing surface 121 of ring 92 when the stopper and bearing plates are in fully inserted position as shown. Similar rings 91 and 92, and a similar spring 90 are inserted in the box member at the upper or opposite side of the stopper for sealing off between the stopper surface and a counterbore 122 in the pin member 88, upper ring 91 being received in that counterbore, and upper ring 92 being received in a larger counterbore 123 in the pin member 88. The spring 90 seats against the shoulder 124 formed between the pin bore 125 and counterbore 122, and urges ring 91 against ring 92 for transmitting sealing pressure to the stopper surface at the annular sealing surface 126 of ring 92. Thus both rings 92 above and below the stopper are in sealing engagement therewith when the valve is open or closed, and thereby when the stopper is open preventing access of drilling mud flowing through the stopper bore or passage 127 to the bearing balls 98. Annular O-rings 128 between metal rings 91 and 92 and annular O-rings 129 between metal rings 91 and counterbores 81 and 122 complete the seal effected between the stopper and the box and pin members.

It will be observed that the stopper bore 127 is as large as the bores 80 and 125 of tubular bodies 77 and 75, which in turn are as large as the main bore of the tubing string, thereby facilitating passage of auxiliary equipment through the stopper when it is in the open position of FIG. 5. On the other hand, the cylindrical outer diameter of the box member 85 is not much larger than the maximum outer diameter of the tubing string 15 facilitating upward and downward travel of the valve sub 59 through the well head assembly. In addition the stopper is always relatively easy to turn when full well pressure is exerted thereagainst, since the stopper is supported by anti-friction bearings across which the loading is well distributed, and the sealing pressure exerted by rings 92 against the stopper is made just sufficient to prevent leakage of fluid by the stopper when the valve is fully closed. Finally, the stopper and bearing plates are held in position within the box member 85 by connection of the pin member 88 into the latter, facilitating ready removal and replacement of the stopper and bearing components as well as the sealing rings.

It should be noted that upper ring 92 is effective only for sealing against elevated fluid pressures existing in bore 125 and lower ring 92 is effective only for sealing against elevated fluid pressures in bore 80. Fluid pressure acting upon the lower end face of lower ring 91 will be transferred to ring 92 and will increase the sealing pressure between surfaces 121 and 120. The sealing pressure between surfaces 121 and 120 will be proportional to the pressure in bore 80 but it can be varied by varying the inner and outer diameters of the annular sealing surface 121 relative to the diameter of counterbore 81. If the inner and outer diameters of the annular sealing surface 121 are made considerably smaller than the diameter of the counterbore 81, the sealing pressure between surfaces 121 and 120 will be greater and the stopper may become somewhat difficult to turn when the pressure in bore 80 is a great deal higher than pressure inlet or outlet bore 125. Best operation will be obtained when the inner and outer diameters of the annular sealing surface 121 are made only slightly smaller than the diameter of counterbore 81.

The modified valve sub 59 shown in FIGS. 7 and 8 is largely of the same or similar construction as that previously described, and accordingly those elements which are not changed have the same numbers as previously applied. There are only two sealing rings in pressure sealing engagement with the spherical surface stopper at longitudinally opposite sides thereof, respectively extending between the stopper and the box member 85 and between the stopper and the pin member 88. The rings 210 and 211 have annular portions 212 in slip fit engagement with counterbores 81 and 122 respectively, and the annular portions 213 of the rings are outwardly offset from the portions 212 within the counterbores 181 and 123 respectively. Annular corrugated flat springs 214 bear against the annular shoulders 215 formed between the ring portions 212 and 213 and urge the rings into pressure sealing engagement with the stopper surface at 216. These springs seat against annular shoulders 217 formed between the counterbores 81 and 181, and the counterbores 122 and 123.

FIGS. 7 and 8 also show a second rotary operating stem 218 having a longitudinally extending keyway slot 219 formed therein and receiving the key 201 integral with the operating stem 112. The stem 218 in turn has a longitudinal extending key 220 extending at right angles to the key 201 and received in a keyway 221 in the stopper projection 222. Both of these keys and keyways have interengageable shoulders extending in lateral planes, the shoulders 223 and 224 associated with key 220 and way 221 extending at right angles to the shoulders 225 and 226 associated with key 201 and way 219 respectively. Thus, the interengageable shoulders formed by the keys and keyways described are operable as a compact universal joint contained within the side opening 103 through the bearing plate 94, for transmitting rotation from the operating stem 112 to the stopper without risk of binding should there be any relative axial movement between the stopper and stem due to fluid pressure loading exerted on the stopper in closed condition.

Bearing plate 95 contains a bore 130 receiving a compression spring 131 and a detent ball 132 to be spring urged into snap seating engagement with indentations 133 spaced circularly about the lateral axis 134 of stopper rotation and sunk into projection 104. As a result, when the stopper is rotated, the ball 132 snaps into the detents when the stopper has arrived at open or closed positions and the operator is notified that the stopper has completely opened or closed, as the case may be.

I claim:

1. An improved valve comprising body means including joined members having longitudinally extending inlet and outlet flow passages, said body means forming a longitudinally extending passage enlargement between said inlet and outlet passages, a plug stopper within said enlargement and having an opening, support means within the enlargement and including plates extending longitudinally of the enlargement and located at laterally opposite sides of the stopper, said support means supporting the stopper for rotation about a lateral axis, said plates being held in predetermined longitudinal locations within the enlargement at least when said body members are joined, said support means intermeshing with the stopper to form a configuration contained entirely within the lateral boundaries of the enlargement so that the intermeshing support means and stopper are insertible longitudinally into the enlargement when said members are disjoined, said body means and one plate forming a laterally extending access opening, the outer part of which extend laterally from said enlargement to the exterior of said body, rotary means inserted into said access opening outer part from the interior of said body and having a shoulder limiting outward movement of said rotary means in said access opening, key means interconnecting said rotary means and stopper to rotate the stopper between open position in which said stopper opening is aligned with said inlet and outlet passages and closed position in which said stopper blocks communication between the inlet and outlet passages, one of said plates containing a longitudinal slot to pass said rotary means when said one plate is inserted into the enlargement, and means for sealing off between the stopper and at least one body member when the stopper is in closed position, said last named means having a bore communicating with the stopper opening and one of said flow passages when the stopper is in an open position.

2. An improved safety valve connectible into a well pipe for controlling flow therethrough, comprising body means including longitudinally joined tubular members having longitudinally extending inlet and outlet flow passages, said body means forming a longitudinally extending passage enlargement between said inlet and outlet passages, a plug stopper within said enlargement and having an opening, support means within the enlargement and including plates extending longitudinally of the enlargement and located at laterally opposite sides of the stopper, said support means supporting the stopper for rotation about a lateral axis, said plates being held in predetermined longitudinal locations within the enlargement at least when said body members are joined, said support means intermeshing with the stopper and having outermost face extent approximating the body inner face defining the enlargement so that the intermeshing support means and stopper are insertible longitudinally into the enlargement when said members are disjoined, said body means and one plate forming a laterally extending access opening, rotary means retained in said opening to rotate the stopper between open position in which said stopper opening is aligned with said inlet and outlet passages and closed position in which said stopper blocks communication between said inlet and outlet passages, said rotary means being blocked against outward withdrawal from said opening by structure in the path of said outward withdrawal, said one plate containing a longitudinal slot to pass the inward terminal of said rotary means when said one plate is moved longitudinally of the enlargement, and means for sealing off between the stopper and at least one body member when the stopper is in closed position, said last named means having a bore communicating with the stopper opening and one of said flow passages when the stopper is in an open position.

3. An improved safety valve connectible into a well pipe for controlling flow therethrough, comprising tubular body means including longitudinally joined tubular pin and box members having longitudinally extending inlet and outlet flow passages, said box member forming a longitudinally extending cylindrical passage enlargement between said inlet and outlet passages, a plug stopper within said enlargement and having a through opening, anti-friction thrust bearing means within the enlargement and including plates extending longitudinally of the enlargement and located at laterally opposite sides of the stopper, said thrust bearing means including two sets of bearing balls retained within longitudinally planar and parallel annular grooves sunk in laterally outwardly facing sides of the stopper and laterally inwardly facing sides of the plates, the major extent of each of said balls being confined within the locus of a sphere defined by the outer spherical surface of the stopper, said thrust bearing means supporting the stopper for rotation about a lateral axis, said thrust bearing means and stopper being everywhere confined within said enlargement and being assembled for insertion as a unit longitudinally into and within the enlargement when said members are disjoined, said plates being held in predetermined longitudinal locations within the enlargement at least when said body members are joined, said thrust bearing means having outermost face extent approximating the body inner face defining the enlargement so that the thrust bearing means remains movable longitudinally into and out of the enlargement when said members are disjoined, said box member and one bearing plate forming a laterally extending side opening, rotary means in said opening to rotate the stopper between open position in which said stopper opening is aligned with said inlet and outlet passages and closed position in which said stopper blocks communication between said inlet and outlet passages, said rotary means being blocked against outward withdrawal from said opening by structure in the path of said outward withdrawal, said one plate containing a longitudinal slot to pass the inward terminal of said rotary means when said one plate is moved longitudinally of the enlargement, said slot being sunk in the outer face of said one plate and being out of communication with the groove in said plate, and means including rings for sealing off between the stopper and said body means when the stopper is in closed position, said last named means having a bore communicating with the stopper opening and said flow passages when the stopper is in an open position.

4. The invention as defined in claim 1 in which said support means and the stopper have stop shoulders which upon rotation of the stopper are brought into registration in open and closed positions of the stopper.

5. The invention as defined in claim 1 in which said access opening in said one plate is cylindrical, said other plate contains a laterally extending cylindrical access opening, and said stopper has cylindrical projections extending laterally oppositely into said plate openings.

6. The invention as defined in claim 1 in which said rotary means is confined within a cylindrical locus defined by the periphery of said body.

References Cited in the file of this patent

UNITED STATES PATENTS

| 181,684 | Keegan | Aug. 29, 1876 |
| 678,132 | Johnson | July 9, 1901 |
| 2,179,033 | Cashion | Nov. 7, 1939 |
| 2,191,232 | Heinen | Feb. 20, 1940 |
| 2,483,891 | Downey | Oct. 4, 1949 |
| 2,622,840 | Cooke | Dec. 23, 1952 |
| 2,734,715 | Knox | Feb. 14, 1956 |
| 2,864,398 | Green | Dec. 16, 1958 |
| 2,894,715 | Bostock | July 14, 1959 |
| 2,908,330 | Fredd | Oct. 13, 1959 |
| 2,912,219 | Clade | Nov. 10, 1959 |

FOREIGN PATENTS

| 111,881 | Sweden | Sept. 19, 1944 |

UNITED STATES PATENT OFFICE
CERTIFICATE OF CORRECTION

Patent No. 3,036,590                                       May 29, 1962

Granville S. Knox

It is hereby certified that error appears in the above numbered patent requiring correction and that the said Letters Patent should read as corrected below.

Column 9, lines 4, 8, and 14, for the claim reference numeral "1", each occurrence, read -- 2 --.

Signed and sealed this 6th day of November 1962.

(SEAL)
Attest:

ERNEST W. SWIDER
Attesting Officer

DAVID L. LADD
Commissioner of Patents